(12) United States Patent
Yan et al.

(10) Patent No.: US 12,527,590 B2
(45) Date of Patent: Jan. 20, 2026

(54) MESH BASKET DEVICE CAPABLE OF MEASURING THE SIZE OF STONES

(71) Applicant: INNOVEX MEDICAL CO., LTD., Shanghai (CN)

(72) Inventors: Hang Yan, Shanghai (CN); Jiabo Ding, Shanghai (CN); Zhongwei Zheng, Shanghai (CN)

(73) Assignee: INNOVEX MEDICAL CO., LTD., Shanghai (CN)

( * ) Notice: Subject to any disclaimer, the term of this patent is extended or adjusted under 35 U.S.C. 154(b) by 258 days.

(21) Appl. No.: 18/554,789

(22) PCT Filed: Oct. 26, 2021

(86) PCT No.: PCT/CN2021/126430
§ 371 (c)(1),
(2) Date: Oct. 11, 2023

(87) PCT Pub. No.: WO2023/070318
PCT Pub. Date: May 4, 2023

(65) Prior Publication Data
US 2024/0188977 A1    Jun. 13, 2024

(51) Int. Cl.
*A61B 17/221*    (2006.01)
(52) U.S. Cl.
CPC .... *A61B 17/221* (2013.01); *A61B 2017/2212* (2013.01)
(58) Field of Classification Search
CPC . A61B 17/221; A61B 17/22031; A61B 17/29; A61B 17/2909; A61B 17/32056;
(Continued)

(56) References Cited

U.S. PATENT DOCUMENTS

| 2009/0082780 A1 | 3/2009 | Lu et al. |
| 2009/0157060 A1 | 6/2009 | Teague |

(Continued)

FOREIGN PATENT DOCUMENTS

| CN | 106659512 A | 5/2017 |
| CN | 107106193 A | 8/2017 |

(Continued)

OTHER PUBLICATIONS

International Search Report, issued in PCT/CN2021/126430, dated Jun. 24, 2022.

(Continued)

*Primary Examiner* — Kankindi Rwego
(74) *Attorney, Agent, or Firm* — Zhu Lehnhoff LLP

(57) ABSTRACT

A mesh basket device capable of measuring the size of stones includes: a mesh basket, a push rod, a mode switching device, an opening size adjustment device, and an adjusting amount measuring device. The push rod is configured to drive the mesh basket to move. The mode switching device is used to switch between a measurement mode and a stone extraction mode. In the stone extraction mode, the opening size of the mesh basket remains unchanged during the movement of the mesh basket. The opening size adjustment device is connected to the mesh basket. In the measurement mode, the opening size adjustment device is configured to adjust the opening size of the mesh basket during the movement. The adjusting amount measuring device is configured to measure the adjusting amount of the opening size adjustment device, which is in a corresponding relationship with the opening size of the mesh basket.

19 Claims, 3 Drawing Sheets

(58) Field of Classification Search
CPC ........... A61B 2017/00367; A61B 2017/00424; A61B 2017/2212; A61B 2017/2215; A61B 2017/2217; A61B 2017/22034; A61B 2017/22035; A61B 2017/2918; A61B 2017/292; A61B 2017/2924; A61B 2017/2929; A61B 90/06; A61B 2090/061; A61B 2090/064; A61M 25/0074
USPC ......................................................... 606/127
See application file for complete search history.

(56) References Cited

U.S. PATENT DOCUMENTS

| 2015/0164522 | A1 | 6/2015 | Budiman et al. | |
| 2020/0315437 | A1* | 10/2020 | Yuasa | A61B 18/1492 |

FOREIGN PATENT DOCUMENTS

| CN | 109069169 | A | 12/2018 |
| CN | 111297439 | A | 6/2020 |
| CN | 107106193 | B | 10/2020 |
| CN | 211796729 | U | 10/2020 |
| CN | 211834598 | U | 11/2020 |
| CN | 218515784 | U | 2/2023 |
| JP | 2016101315 | A | 6/2016 |
| WO | 2020138946 | A1 | 7/2020 |

OTHER PUBLICATIONS

Written Opinion, issued in PCT/CN2021/126430, dated Jun. 24, 2022.
Examination Report, issued in EP21961695.0 by European Patent Office, dated Jul. 4, 2025.
European Search Report, issued in EP21961695.0 by European Patent Office, dated May 23, 2024.
Examination Report, issued in CN202111248308.4 (priority application), by CNIPA, dated Jul. 31, 2024.
Examination Report, issued in CN202111248308.4 (priority application), by CNIPA, dated May 6, 2025.
Examination Report, issued in CN202111248308.4 (priority application), by CNIPA, dated Jul. 29, 2025.
Rejection, issued in CN202111248308.4 (priority application), by CNIPA, dated Oct. 27, 2025.

* cited by examiner

MESH BASKET DEVICE CAPABLE OF MEASURING THE SIZE OF STONES

TECHNICAL FIELD

The present invention relates to the technical field of stone extraction, and in particular, to a mesh basket device capable of measuring the size of stones.

BACKGROUND

During stone extraction surgery, large stones at the site are crushed by laser, and then the stones are removed through a stone extraction mesh basket under an endoscope. The stone extraction mesh basket is passed through the endoscope, and the endoscope is passed through the guide sheath. When the stone extraction mesh basket grabs the stone, it exits the guide sheath with the endoscope. The maximum passing diameter of the guide sheath is 4 mm. Because the endoscope will magnify the inside, it is impossible to directly judge the size of the stone on the display. When the stone is too large, it may fail to pass through the guide sheath and damage the instrument.

SUMMARY

The present invention provides a mesh basket device capable of measuring the size of stones, to solve the problem in the existing technology that the size of the stones cannot be directly judged.

The present invention provides a mesh basket device capable of measuring the size of stones, comprising: a mesh basket, a push rod, a mode switching device, an opening size adjustment device, and an adjusting amount measuring device;
the far end of the push rod is connected to the mesh basket, and the push rod is configured to be able to drive the mesh basket to move back and forth;
the mode switching device is used to switch between the measurement mode and the stone extraction mode;
in the stone extraction mode, the opening size of the mesh basket remains unchanged during the movement of the mesh basket driven by the push rod;
the opening size adjustment device is connected to the mesh basket;
in the measurement mode, the opening size adjustment device is configured to be able to adjust the opening size of the mesh basket during the movement of the mesh basket driven by the push rod;
the adjusting amount measuring device is configured to be able to measure the adjusting amount of the opening size adjustment device, and the adjusting amount is in a corresponding relationship with the opening size of the mesh basket.

Optionally, the mode switching device comprises a stone extraction mode track, a measurement mode track, and a switching piece;
the switching piece is configured to be able to control the push rod to switch between the stone extraction mode track and the measurement mode track;
a first limit slot is disposed in the measurement mode track;
a convex point is disposed on the push rod, and in the measurement mode, the convex point moves in the first limit slot.

Optionally, the mode switching device further comprises a first spring;
the stone extraction mode track is arranged parallel to the measurement mode track;
the first spring is disposed between the push rod and the measurement mode track;
when the first spring is in its natural state, the push rod is in the stone extraction mode track, and when the first spring is controlled to be in a compressed state, the push rod is in the measurement mode track.

Optionally, the first limit groove is in a wavy shape.

Optionally, the measurement mode track is provided with one or multiple position points;
when there are multiple position points, the tactile feedback at each position point is different.

Optionally, the mode switching device includes a roller; a gear guide rail is disposed at the lower end of the push rod;
the radial distance between the roller and the gear guide rail is variable;
when switching to the measurement mode, the radial distance between the roller and the gear guide rail becomes smaller, which can meet the cooperation between the roller and the gear guide rail;
when switching to the stone extraction mode, the radial distance between the roller and the gear guide rail becomes larger, which can meet the non-cooperation between the roller and the gear guide rail.

Optionally, the gear guide rail is provided with one or multiple position points;
when there are multiple position points, the tactile feedback at each position point is different.

Optionally, the mode switching device includes a track, a convex point;
the convex point is configured to be able to protrude outside the push rod and also be able to retract inside the push rod;
a second limit slot is disposed in the track;
in the measurement mode, the convex point protrudes outside the push rod, and the convex point moves in the second limit slot; in the stone extraction mode, the convex point retracts inside the push rod.

Optionally, the second limit slot is in a wavy shape.

Optionally, the track is provided with one or multiple position points;
when there are multiple position points, the tactile feedback at each position point is different.

Optionally, the opening size adjustment device comprises a handle, an adjustment piece, and a guide rope;
the adjustment piece is connected to the near end of the push rod through the guide rope, and the adjustment piece is also connected to the handle; the near end of the push rod is the end of the push rod away from the mesh basket;
the guide rope is disposed at the far end of the handle; the far end of the handle is the end of the handle close to the mesh basket;
the near end of the push rod is threaded through the guide rope or connected to the far end of the guide rope; the far end of the guide rope is the end of the guide rope close to the mesh basket;
the relative position of the guide rope and the push rod is fixed, and the guide rope is able to move relative to the handle.

Optionally, the handle comprises a front section and a rear section, from the far end to the near end of the handle, the front section and the rear section are distributed in sequence;

the outer diameter of the front section is smaller than the outer diameter of the rear section;

the guide rope is disposed on the front section.

Optionally, A second spring is disposed in the guide rope; the second spring is configured to apply axial force to the guide rope.

Optionally, the opening size of the mesh basket is the size of the tangent circle of the inner ring of the mesh basket or the size of the intersecting circle of the outer ring of the mesh basket.

The mesh basket device capable of measuring the size of stones provided by the present invention can obtain the opening size of the mesh basket by measuring the adjustment amount of the opening size adjustment device. Since the endoscope magnifies the displayed size of objects within its field of view, during surgery, both the mesh basket and the stones are simultaneously magnified, therefore, the size of the mesh basket can be used as a reference to determine the size of the stones. During the surgery, doctors can determine the size range of stones by comparing the size of the stones and the mesh basket under the endoscope, so that it is possible to determine whether the stone can pass through the sheath in the first time, saving surgical time and reducing the possibility of the stone not being able to pass through the sheath and getting stuck in the channel.

In one optional scheme of the present invention, in the measurement mode, during the movement of the push rod, one or multiple positions are equipped with tactile feedback to remind the user to compare the size of the mesh basket under the endoscope when in the corresponding position.

In another optional scheme of the present invention, a spring is disposed inside the guide rope, which can apply axial force to the guide rope to offset the extension of the guide rope caused by twisting; the surgical process is carried out through the natural cavity of the human body, requiring the endoscope to twist multiple times to reach the designated position. The guide rope, which is the internal traction part at the middle position, will have stretching extension, and there will be a certain error in the opening span of the mesh basket. The more serious the twist is, the greater the error will be. After adding the built-in spring, continuous axial force is applied to the guide rope to offset the extension of the guide rope caused by twisting, ensuring that the error is controllable.

BRIEF DESCRIPTION OF DRAWINGS

To describe the technical solutions in the embodiments of the present invention or in the prior art more clearly, accompanying drawings required to describe the embodiments or the prior art are briefly described below. It is obvious that the accompanying drawings described below are only some embodiments of the present invention. It is apparent to those of ordinary skill in the art that other drawings may be further obtained based on the accompanying drawings without inventive effort.

DESCRIPTION OF REFERENCE SIGNS

Figure 1:
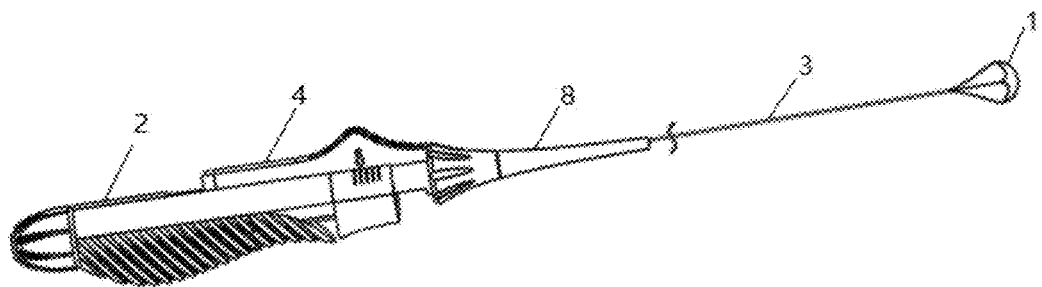
FIG. 1 is a first schematic diagram of a mesh basket device capable of measuring the size of stones according to an embodiment of the present invention.

1—mesh basket;
11—tangent circle of the inner ring of the mesh basket;
2—handle;
21—front section;
22—rear section;
3—push rod;
4—adjustment piece;
5—adjusting amount measuring device;
6—roller;
7—slider;
8—guide rope;
9—second spring;
10—convex point.

DETAILED DESCRIPTION OF THE EMBODIMENTS

The technical solutions in the embodiments of the present disclosure will be clearly and completely described below in conjunction with the accompanying drawings in the embodiments of the present disclosure. It is obvious that the described embodiments are only part but not all of the embodiments of the present disclosure. All other embodiments obtained by those skilled in the art without creative efforts based on the embodiments in the present disclosure are within the protection scope of the present disclosure The terms such as "upper", "lower", "upper end", "lower end", "lower surface", "upper surface", and the like indicating positional relationships are based on the orientation or positional relationships shown in the drawings. They are used for the convenience of describing the present invention and simplifying the description, and should not be interpreted as indicating or implying that the device or component referred to must have a specific orientation, be constructed or operated in a specific orientation. Therefore, they should not be understood as limitations of the present invention.

In the description of the present invention, the terms "first" and "second" are used for descriptive purposes only and should not be understood as indicating or implying relative importance or a specific number of the indicated technical features. Thus, features labeled with "first" or "second" may include one or more of such features, either explicitly or implicitly.

In the description of the present invention, the term "multiple" means multiple, such as two, three, four, etc., unless otherwise specifically limited.

In the description of the present invention, unless otherwise specifically defined and limited, terms such as "connected" should be broadly interpreted. For example, it can be a fixed connection, a detachable connection, or an integral connection; it can be a mechanical connection, an electrical connection, or a communication connection; it can be a direct connection or an indirect connection through an intermediate medium; it can be an internal connection within two components or an interactive relationship between two components. Ordinary skilled persons in the field can understand the specific meanings of the above terms in the present invention based on specific circumstances.

The technical solutions of the present invention are described in detail below with specific embodiments. The following specific embodiments may be combined with each other, and the same or similar concepts or processes may not be repeated in some embodiments.

In one embodiment, a mesh basket device capable of measuring the size of stones is provided, which includes a mesh basket 1, a push rod 3, a mode switching device, an opening size adjustment device, and an adjusting amount measuring device; the far end of the push rod 3 is connected to the mesh basket 1, and the push rod 3 is configured to be able to drive the mesh basket 1 to move back and forth; the mode switching device is used to switch between the measurement mode and the stone extraction mode. Doctors can choose between the measurement mode and the stone extraction mode by switching between modes.

In the stone extraction mode, the opening size of the mesh basket remains unchanged during the movement of the mesh basket driven by the push rod; the opening size adjustment device is connected to the mesh basket.

In the measurement mode, during the movement of the mesh basket driven by the push rod, the opening size adjustment device is configured to be able to adjust the opening size of the mesh basket; the adjusting amount measuring device is configured to be able to measure the adjusting amount of the opening size adjustment device, and the adjusting amount is in a corresponding relationship with the opening size of the mesh basket.

In one embodiment, the mode switching device includes a stone extraction mode track, a measurement mode track and a switching piece, please refer to FIG. 1. The switching piece is configured to be able to control the push rod to switch between the stone extraction mode track and the measurement mode track; a first limit slot is disposed in the measurement mode track; a convex point is disposed on the push rod, and in the measurement mode, the convex point moves in the first limit slot.

In a preferred embodiment, the mode switching device also includes a first spring; the stone extraction mode track is arranged parallel to the measurement mode track, and the first spring is disposed between the push rod and the measurement mode track. Please refer to FIG. 1, as shown in FIG. 1, the stone extraction mode track and the measurement mode track are disposed from top to bottom, the stone extraction mode track is on the top, the measurement mode track is on the bottom. When not pressed, the first spring is in its natural state, the push rod is in the stone extraction mode track. When pressed, the first spring is controlled to be in a compressed state, and the push rod is in the measurement mode track.

The working process of the mesh basket device in the above embodiment is as follows: in the pressed state, push the push rod and measure the size of the mesh basket in the measurement mode; when the push rod is pushed to the end of the guide rail, stop pressing, and the first spring will automatically reset the push rod to the stone extraction mode track; withdraw the push rod from the stone extraction mode track and complete the stone extraction.

In a preferred embodiment, the first limit slot is in a wavy shape, and without the application of external force, the push rod will not easily move.

In a preferred embodiment, the measurement mode track is provided with one or multiple position points. When there are multiple position points, the tactile feedback at each position point is different, reminding the user to measure the size of the mesh basket under the endoscope when at the corresponding position.

Figure 2:
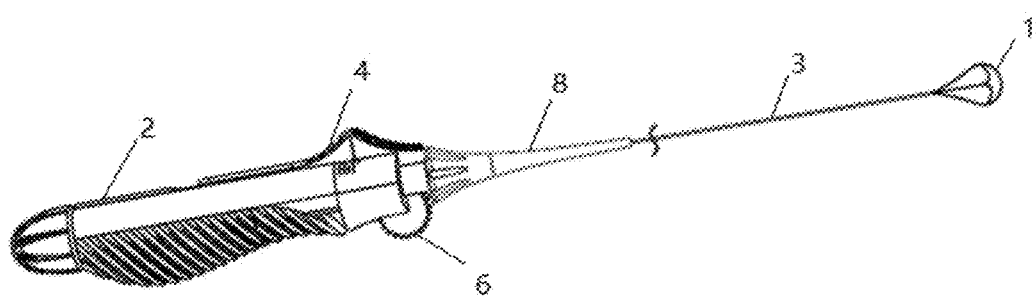
FIG. 2 is a second schematic diagram of a mesh basket device capable of measuring the size of stones according to another embodiment of the present invention.
Figure 3:
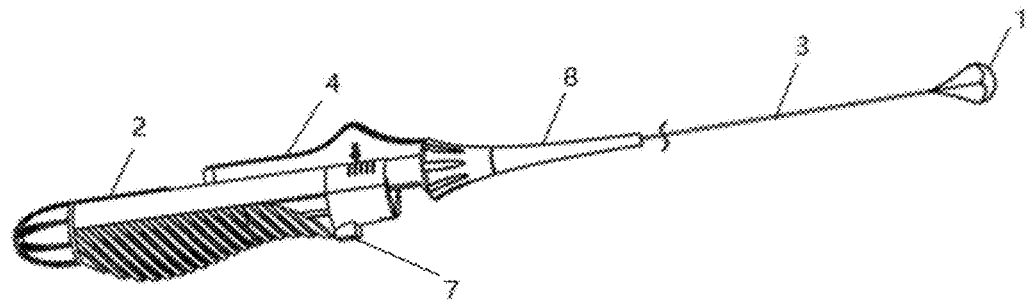
FIG. 3 is a third schematic diagram of a mesh basket device capable of measuring the size of stones according to another embodiment of the present invention.

In one embodiment, the mode switching device includes a roller 6, please refer to FIG. 2; a gear guide rail is disposed at the lower end of the push rod; the radial distance between the roller 6 and the gear guide rail is changeable. When switching to the measurement mode, the radial distance between the roller and the gear guide rail becomes smaller, which can meet the cooperation between the roller and the gear guide rail; when switching to the stone extraction mode, the radial distance between the roller and the gear guide rail becomes larger, which can meet the non-cooperation between the roller and the gear guide rail.

In a preferred embodiment, the gear guide rail is provided with one or multiple position points. When there are multiple position points, the tactile feedback at each position point is different, reminding the user to measure the size of the mesh basket under the endoscope when at the corresponding position. In one embodiment, different tactile feedback at each position point can be achieved through different gear shapes.

In one embodiment, the mode switching device includes a track, a convex point 10; the convex point 10 is disposed inside the push rod, and the convex point 10 is configured to be able to extend outside the push rod, and also be able to retract inside the push rod; a second limit slot is disposed in the track; in the measurement mode, the convex point extends outside the push rod, and the convex point moves in the second limit slot; in the stone extraction mode, the convex point retracts inside the push rod.

Figure 4:
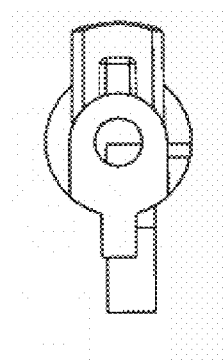
FIG. 4 is a schematic diagram of a slider according to an embodiment of the present invention.

In one embodiment, the extension and retraction of the convex point outside and inside the push rod are realized through a slider 7, as shown in FIG. 4.

In a preferred embodiment, the second limit slot is in a wavy shape, and without the application of external force, the push rod will not easily move.

Preferably, the track is provided with one or multiple position points. When there are multiple position points, the tactile feedback at each position point is different, reminding the user to measure the size of the mesh basket under the endoscope when at the corresponding position.

In the prior art, doctors crush and remove larger stones in the body through an endoscope. Because the endoscope has a limited field of view, it will magnify the display position, which makes it impossible for the doctor to judge the actual size of the stones seen on the screen. Because the endoscope magnifies the displayed size of the objects within its field of view, during surgery, both the mesh basket and the stones are magnified at the same time, so the size of the mesh basket can be used as a reference to judge the size of the stones. The above embodiments can obtain the opening size of the mesh basket, and by comparing the size of the stones with the mesh basket, the user can determine the size of the stones at a glance, judge whether the surgery can be completed, and whether it is necessary to continue crushing the stones. At the same time, each endoscope has a different magnification ratio. The above embodiment is to give the size of the mesh basket, so that the doctor can judge the size range of the stones by comparing the size of the mesh basket and the stones under the endoscopic view, such as larger than 2 mm, but smaller than 3 mm. Therefore, the mesh basket device capable of measuring the size of stones in the above embodiments can be applied to all endoscopes.

In one embodiment, the opening size adjustment device includes a handle 2 and an adjustment piece 4; in order to protect the near end of the push rod 3, the opening size adjustment device also includes a guide rope 8, please refer to FIG. 1, FIG. 2, FIG. 3 and FIG. 6. The adjustment piece 4 is connected to the near end of the push rod 3 through the guide rope 8, and the adjustment piece 4 is also connected to the handle 2; the near end of the push rod 3 is the end of the push rod 3 that is far away from the mesh basket 1; the guide rope 8 is disposed at the far end of the handle 2; the far end of the handle 2 is the end of the handle 2 that is close to the mesh basket 1. The near end of the push rod 3 is threaded through the guide rope 8 or connected to the far end of the guide rope 8; the far end of the guide rope 8 is the end of the guide rope 8 that is close to the mesh basket 1. The relative position of the guide rope 8 and the push rod 3 is fixed, and the guide rope 8 is able to move relative to the handle 2.

In one embodiment, shown in FIG. 2, the handle includes a front section 21 and a rear section 22, from the far end to the near end of the handle, the front section 21 and the rear section 22 are distributed in sequence; the outer diameter of the front section 21 is smaller than the outer diameter of the rear section 22; the guide rope 8 is disposed on the front section 21.

Figure 5:
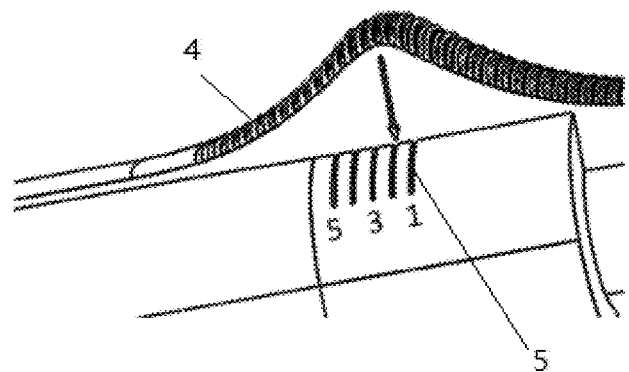
FIG. 5 is a schematic diagram of an adjusting amount measuring device according to an embodiment of the present invention.
Figure 6:
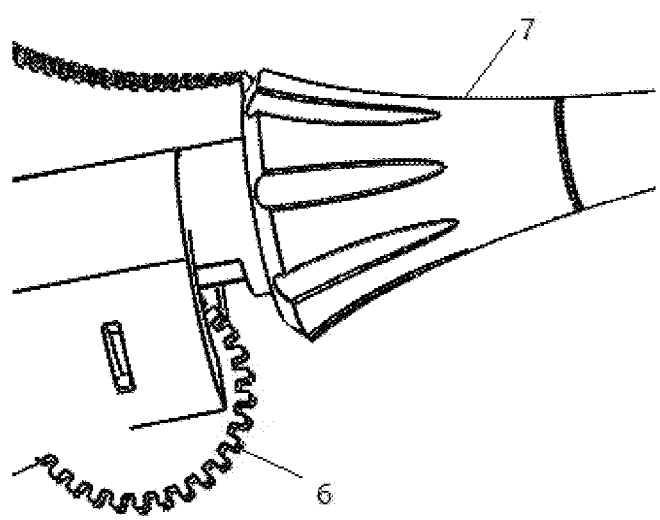
FIG. 6 is a first schematic diagram of a guide rope according to an embodiment of the present invention.

In one embodiment, the adjusting amount measuring device is shown in FIG. 5, which is a rod with measurement scales.

Figure 7:
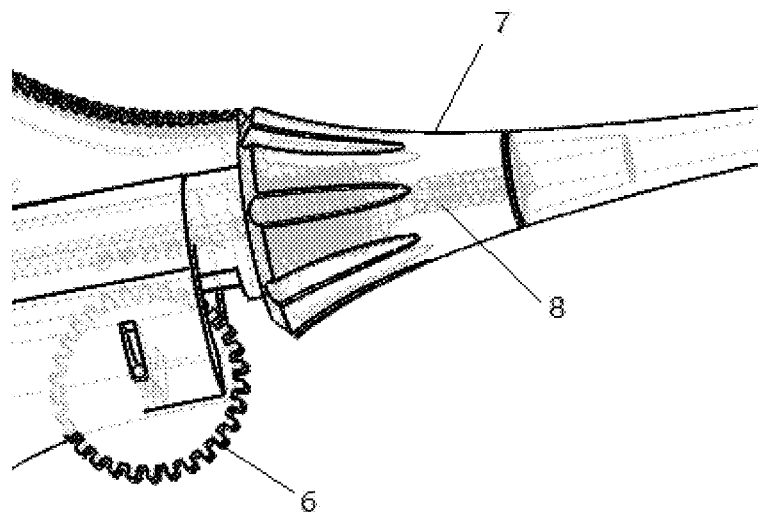
FIG. 7 is a second schematic diagram of a guide rope according to a preferred embodiment of the present invention.

In one embodiment, in order to prevent the instrument from twisting inside the endoscope in the body and causing dimensional errors in the stroke, a second spring 9 is disposed inside the guide rope 8; the second spring 9 is configured to be able to apply axial force to the guide rope 8, please refer to FIG. 7. When performing surgery through the human ureter, and there are various positions in the kidney, the endoscope needs to be twisted multiple times to reach the designated position. If there is no built-in spring (i.e., the second spring 9), the guide rope, which is the internal traction part at the middle position, will have stretching extension, and there will be a certain error in the opening span of the mesh basket 1 at the far end, the more serious the twist is, the greater the error will be. After adding the built-in spring (i.e., the second spring 9), continuous axial force is applied to the guide rope to offset the extension of the guide rope caused by twisting, ensuring that the error is controllable.

In one embodiment, a tactile feedback is disposed at one or more positions during the adjustment process of the mesh basket opening size adjustment device, reminding the user to compare the size of the mesh basket under the endoscope when at the corresponding position.

Figure 8:
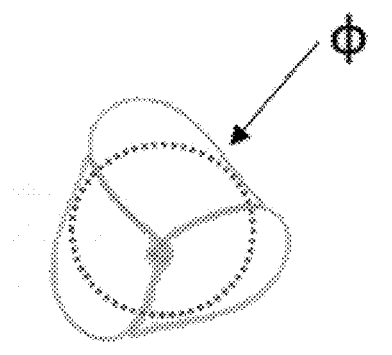
FIG. 8 is a schematic diagram of a mesh basket viewed from the far end to the near end of FIG. 1.

In one embodiment, the opening size of the mesh basket is the size of the tangent circle of the inner ring of the mesh basket or the size of the intersecting circle of the outer ring of the mesh basket. As shown in FIG. 8, it is a schematic view from the far end to the near end of FIG. 1 (i.e., the B direction), and the dashed line in the figure shows the tangent circle 11 of the inner ring of the mesh basket.

Figure 9:
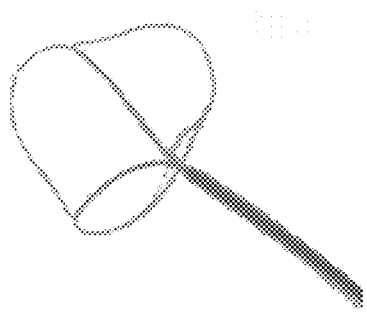
FIG. 9 is a schematic diagram of a mesh basket viewed from the near end to the far end of FIG. 1.

As shown in FIG. 9, it is a schematic view from the near end to the far end of FIG. 1 (i.e., the A direction), showing the shape of the mesh basket from the user's perspective.

In the description of this specification, the descriptive terms "one embodiment," "one example," "specific implementation process." "one example." and the like refer to specific features, structures, materials, or characteristics described in conjunction with this embodiment or example and are included in at least one embodiment or example of the present invention. In this specification, the illustrative expressions of the above terms do not necessarily refer to the same embodiment or example. Moreover, the specific features, structures, materials, or characteristics described can be appropriately combined in any one or more embodiments or examples.

Finally, it should be noted that the above embodiments are only used to illustrate the technical solutions of the present invention, but not to limit the present invention. Although the present invention has been described in detail with reference to the foregoing embodiments, a person of ordinary skill in the art shall understand that modifications may be made to the technical solutions described in the foregoing embodiments, or some or all of the technical features thereof may be equivalently substituted. However, these modifications or substitutions do not essentially depart the corresponding technical solutions from the scope of the technical solutions of the embodiments of the present invention.

The invention claimed is:

1. A mesh basket device capable of measuring the size of stones, comprising: a mesh basket, a push rod, a mode switching device, an opening size adjustment device, and an adjusting amount measuring device;
   a far end of the push rod is connected to the mesh basket, and the push rod is configured to be able to drive the mesh basket to move back and forth;
   the mode switching device is used to switch between a measurement mode and a stone extraction mode;
   in the stone extraction mode, an opening size of the mesh basket remains unchanged during the movement of the mesh basket driven by the push rod;
   the opening size adjustment device is connected to the mesh basket;
   in the measurement mode, the opening size adjustment device is configured to be able to adjust the opening size of the mesh basket during the movement of the mesh basket driven by the push rod;
   the adjusting amount measuring device is configured to be able to measure an adjusting amount of the opening size adjustment device, and the adjusting amount is in a corresponding relationship with the opening size of the mesh basket, wherein the mode switching device comprises a stone extraction mode track, a measurement mode track, and a switching piece, wherein the switching piece is configured to be able to control the push rod to switch between the stone extraction mode track and the measurement mode track, wherein a first limit slot is disposed in the measurement mode track, wherein a convex point is disposed on the push rod, and in the measurement mode, and wherein the convex point moves in the first limit slot.

2. The mesh basket device capable of measuring the size of stones according to claim 1, wherein the opening size of the mesh basket is the size of the tangent circle of the inner ring of the mesh basket or the size of the intersecting circle of the outer ring of the mesh basket.

3. The mesh basket device capable of measuring the size of stones according to claim 1, wherein the opening size adjustment device comprises a handle, an adjustment piece, and a guide rope;
   the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

4. The mesh basket device capable of measuring the size of stones according to claim 1, wherein the mode switching device further comprises a first spring;

the stone extraction mode track is arranged parallel to the measurement mode track;

the first spring is disposed between the push rod and the measurement mode track;

when the first spring is in its natural state, the push rod is in the stone extraction mode track, and when the first spring is controlled to be in a compressed state, the push rod is in the measurement mode track.

5. The mesh basket device capable of measuring the size of stones according to claim 4, wherein the opening size adjustment device comprises a handle, an adjustment piece, and a guide rope;

the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

6. The mesh basket device capable of measuring the size of stones according to claim 4, wherein a first limit groove is in a wavy shape.

7. The mesh basket device capable of measuring the size of stones according to claim 6, wherein the opening size adjustment device comprises a handle, an adjustment piece, and a guide rope;

the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

8. The mesh basket device capable of measuring the size of stones according to claim 6, wherein the measurement mode track is provided with one or multiple position points;

when there are multiple position points, a tactile feedback at each position point is different.

9. The mesh basket device capable of measuring the size of stones according to claim 8, wherein the opening size adjustment device comprises a handle, an adjustment piece, and a guide rope;

the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

10. The mesh basket device capable of measuring the size of stones according to claim 1, wherein the mode switching device includes a roller; a gear guide rail is disposed at a lower end of the push rod;

the radial distance between the roller and the gear guide rail is variable;

when switching to the measurement mode, the radial distance between the roller and the gear guide rail becomes smaller, which can meet the cooperation between the roller and the gear guide rail;

when switching to the stone extraction mode, the radial distance between the roller and the gear guide rail becomes larger, which can meet the non-cooperation between the roller and the gear guide rail.

11. The mesh basket device capable of measuring the size of stones according to claim 10, wherein the opening size adjustment device comprises a handle, an adjustment piece, and a guide rope;

the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

12. The mesh basket device capable of measuring the size of stones according to claim 10, wherein the gear guide rail is provided with one or multiple position points;

when there are multiple position points, a tactile feedback at each position point is different.

13. The mesh basket device capable of measuring the size of stones according to claim 12, wherein the opening size adjustment device comprises a handle, an adjustment piece, and a guide rope;

the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

14. The mesh basket device capable of measuring the size of stones according to claim 1, wherein the mode switching device includes a track, a convex point;

The convex point is configured to be able to protrude outside the push rod and also be able to retract inside the push rod;

a second limit slot is disposed in the track;

in the measurement mode, the convex point protrudes outside the push rod, and the convex point moves in the second limit slot; in the stone extraction mode, the convex point retracts inside the push rod.

15. The mesh basket device capable of measuring the size of stones according to claim 14, wherein the second limit slot is in a wavy shape.

16. The mesh basket device capable of measuring the size of stones according to claim 15, wherein the track is provided with one or multiple position points;

when there are multiple position points, a tactile feedback at each position point is different.

17. The mesh basket device capable of measuring the size of stones according to claim 1, the opening size adjustment device comprises a handle, an adjustment piece, and a guide rope;

the adjustment piece is connected to a near end of the push rod through the guide rope, and the adjustment piece is also connected to the handle; the near end of the push rod is the end of the push rod away from the mesh basket;

the guide rope is disposed at a far end of the handle; the far end of the handle is the end of the handle close to the mesh basket;

the near end of the push rod is threaded through the guide rope or connected to a far end of the guide rope; the far end of the guide rope is the end of the guide rope close to the mesh basket;

the relative position of the guide rope and the push rod is fixed, and the guide rope is able to move relative to the handle.

18. The mesh basket device capable of measuring the size of stones according to claim 17, wherein the handle comprises a front section and a rear section, from the far end to a near end of the handle, the front section and the rear section are distributed in sequence;

the outer diameter of the front section is smaller than the outer diameter of the rear section;

the guide rope is disposed on the front section.

19. The mesh basket device capable of measuring the size of stones according to claim 18, wherein a second spring is disposed in the guide rope;

the second spring is configured to apply axial force to the guide rope.

* * * * *